(12) United States Patent
Milanovic et al.

(10) Patent No.: US 12,719,125 B2
(45) Date of Patent: Aug. 25, 2026

(54) POTTING FEATURE

(71) Applicant: Rimac Technology LLC, Sveta Nedelja (HR)

(72) Inventors: Niko Milanovic, Nasice (HR); Mario Batistic, Rijeka (HR); Gregor Bozic, Krsko (SI)

(73) Assignee: Rimac Technology LLC, Sveta Nedelja (HR)

( * ) Notice: Subject to any disclaimer, the term of this patent is extended or adjusted under 35 U.S.C. 154(b) by 888 days.

(21) Appl. No.: 17/958,757

(22) Filed: Oct. 3, 2022

(65) Prior Publication Data

US 2023/0110510 A1 Apr. 13, 2023

(30) Foreign Application Priority Data

Oct. 13, 2021 (EP) .................................... 21202396

(51) Int. Cl.
*H01M 50/244* (2021.01)
*H01M 10/04* (2006.01)
(Continued)

(52) U.S. Cl.
CPC ......... *H01M 50/244* (2021.01); *H01M 10/04* (2013.01); *H01M 10/613* (2015.04); *H01M 10/6556* (2015.04); *H01M 50/121* (2021.01); *H01M 50/213* (2021.01); *H01M 50/238* (2021.01); *H01M 50/24* (2021.01); *Y02E 60/10* (2013.01)

(58) Field of Classification Search
CPC ............... H01M 10/04; H01M 10/613; H01M 10/6556; H01M 50/121; H01M 50/213; H01M 50/238; H01M 50/24; H01M 50/244; Y02E 60/10
See application file for complete search history.

(56) References Cited

U.S. PATENT DOCUMENTS

2011/0135975 A1 6/2011 Fuhr et al.
2014/0322581 A1* 10/2014 Ruter ................. H01M 50/503 429/186

FOREIGN PATENT DOCUMENTS

CN 201866429 U 6/2020
DE 102016124705 A1 6/2018
(Continued)

OTHER PUBLICATIONS

Office Action, dated Jan. 22, 2026, for Chinese Patent Application No. 202211206390. (19 pages).

*Primary Examiner* — Lingwen R Zeng
(74) *Attorney, Agent, or Firm* — Seed Intellectual Property Law Group LLP

(57) ABSTRACT

Disclosed herein are cell holders for holding a plurality of battery cells, each cell holder including a body, said body having an upper surface, a lower surface, and a plurality of through openings, wherein each through opening extends between the upper surface and the lower surface and is arranged to receive a battery cell, wherein in each through opening a deformable member is protruding in the through opening in a direction which is perpendicular to the direction of extension of the through opening to thereby decrease the diameter of the through opening such that the diameter of the through opening in the plane in which the deformable member is protruding is smaller than the outer diameter of the battery cell.

13 Claims, 4 Drawing Sheets

50 1 1-2 1-1 2 1-3

(51) Int. Cl.

| | |
|---|---|
| ***H01M 10/613*** | (2014.01) |
| ***H01M 10/6556*** | (2014.01) |
| ***H01M 50/121*** | (2021.01) |
| *H01M 50/213* | (2021.01) |
| *H01M 50/238* | (2021.01) |
| *H01M 50/24* | (2021.01) |

(56) References Cited

FOREIGN PATENT DOCUMENTS

| | | | |
|---|---|---|---|
| JP | 2006156171 | A | 6/2006 |
| WO | 2020051604 | A1 | 3/2020 |

* cited by examiner

POTTING FEATURE

TECHNICAL FIELD

The present invention relates to the technical field of battery modules. More specifically, the present invention relates to a cell holder for a battery module.

BACKGROUND

Battery cells and in particular battery modules comprising a plurality of battery cells such as tens, hundreds or even thousands of battery cells densely packed within a limited space of the battery module as well as battery packs comprising one or more such battery modules play an increasing role in renewable energy usage and storage. As an example, in the recent years the popularity and wide use of motor vehicles that entirely or at least in part use electric power stored in one or more such battery packs for propulsion, such as electric vehicles or hybrid vehicles, has increased significantly such that these motor vehicles tend to replace the conventional fuel-based vehicles. However, also the conventional fuel-based vehicles may use one or more such battery packs as motor vehicle starter battery.

In the example of electric vehicles and hybrid vehicles, the battery pack is mounted in an available location in the vehicle, such as for example in the floor of the vehicle or in an available space in the luggage compartment of the vehicle and hence has limited dimensions and needs to be compact to fit in the available space and therefore the packaging density of the battery cells in the battery module(s) mounted in the battery pack needs to be high. Even further, it is important that the battery cells are packed in a stable manner in the battery module to increase the structural stability of the battery module and accordingly the battery pack and to make the battery pack more sustainable to mechanical influence from the outside.

Normally, the battery cells in the battery module are densely packed into one or more cell holders. Such cell holders should firmly hold the battery cells in place and should also enable that a cooling system for cooling the battery cells is integrated around the battery cells.

To ensure that the battery cells are firmly held in place into the respective one or more cell holders normally each one of the plurality of battery cells is glued in the cell holder. The gluing may be performed by way of potting. Potting is a process of filling a space with a potting material. During the potting the potting material is normally fluid and becomes solid after a curing process is performed. The curing process may be performed under ambient temperature or under increased temperature which may speed up the curing process. Nevertheless, until the potting material is cured, and hence is solidified, there is a possibility that the potting material leaks through openings of the space into which it is filled to positions in the battery module in which it is not desirable to have a potting material.

Therefore, there is a need for preventing potting leakage in a battery module in a simple and efficient way.

Hence, it is an object of the present invention to provide for preventing potting leakage in a battery module in a simple and efficient way.

SUMMARY

The mentioned problems and drawbacks are addressed by the subject matter of the independent claims. Further preferred embodiments are defined in the dependent claims.

According to an aspect of the present invention there is provided a cell holder for holding a plurality of battery cells, said cell holder comprising a body, said body having an upper surface, a lower surface, and a plurality of through openings, wherein each through opening extends between the upper surface and the lower surface and is arranged to receive a battery cell, wherein in each through opening a deformable member is protruding in the through opening in a direction which is perpendicular to the direction of extension of the through opening to thereby decrease the diameter of the through opening such that the diameter of the through opening in the plane in which the deformable member is protruding is smaller than the outer diameter of the battery cell.

According to a further aspect of the present invention there is provided a battery module comprising a first cell holder according to the previous aspect and a plurality of battery cells each one of the plurality of battery cells being inserted in one of the through openings.

According to a still further aspect of the present invention there is provided a method of manufacturing a battery module, said method comprising the steps of: providing at least one cell holder according to the above-elaborated aspect; inserting in each through hole of the cell holder a battery cell, filling potting material along the top and/or bottom surface of the body of the cell holder; and providing at least one cooling channel above or below the body of the at least one cell holder.

BRIEF DESCRIPTION OF THE DRAWINGS

Embodiments of the present invention, which are presented for better understanding the inventive concepts, but which are not to be seen as limiting the invention, will now be described with reference to the figures in which.

DETAILED DESCRIPTION

Figure 1A:
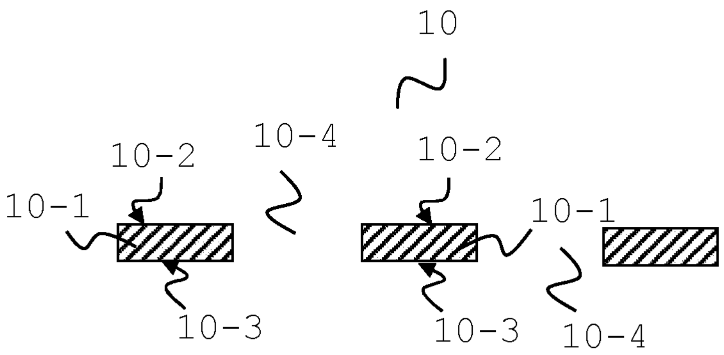
FIGS. 1A and 1B show a schematic view of a part of a cell holder and a battery cell as an environment for employing embodiments of the present invention.
Figure 1B:
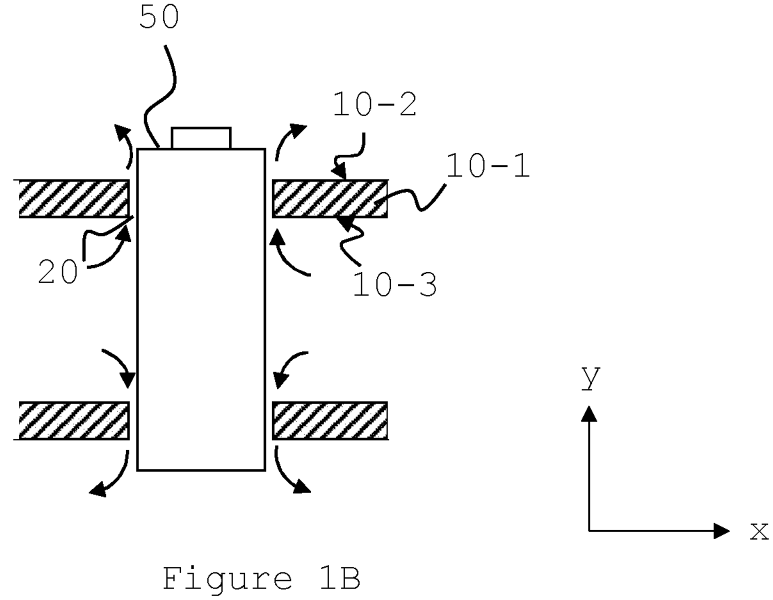

FIGS. 1A and 1B show a schematic view of a part of a cell holder and a battery cell as an environment for employing embodiments of the present invention. It is to be understood that details of the cell holder as described here are also applicable to embodiments of the present invention.

FIG. 1A shows a schematic view of a part of a cell holder 10. The cell holder 10 comprises a body 10-1 (shown in FIGS. 1A and 1B with the striped pattern fill) having an upper surface 10-2, a lower surface 10-3 and a plurality of through openings 10-4 (two such through openings 10-4 being shown in figure LA) extending between the upper surface and the lower surface. One battery cell 50 is normally inserted in each through opening 10-4. For example, there is shown in FIG. 1B one battery cell 50 inserted in a through hole 10-4 of a first cell holder 10 and a second cell holder 10. In FIG. 1B the first cell holder 10 is arranged in the upper portion of the battery cell 50 (upper portion of the plurality of battery cells 50) and the second cell holder 10 is arranged in the lower portion of the battery cell 50 (lower portion of the plurality of battery cells).

Normally small gap 20 exists between the battery cell 50 when inserted in the corresponding through opening 10-4 and the body 10-1 of the cell holder 10. This small gap 20 enables to insert the battery cell 50 in the corresponding through opening 10-4. In other words, the diameter of the through opening 10-4 of the cell holder 10 is slightly larger (larger for a predetermined value) than the outer diameter of the battery cell 50 in order that it is enabled that the battery cell 50 is inserted in the through opening 10-4 of the cell holder 10.

Each battery cell 50 is fixed to the body 10-1 of the cell holder 10 by way of potting with a potting material. The potting material may be filled along the upper surface and/or lower surface of the body 10-1 of the cell holder 10. However, the small gaps 20, while facilitating inserting of the battery cells 50 in the corresponding through openings 10-4 of the cell holder, lead to leakage of the potting material through the small gaps 20 away from the battery cells 50 until the potting material is cured which is disadvantageous in the battery module productions. For example, in FIG. 1B, if potting material is filled along the lower surface of the body 10-1 of the upper cell holder 10 then the potting material may leak through the gap 20 as shown with the arrows in FIG. 1B and solidify at positions away from the battery cell 50. For example, if cooling channels arranged to receive cooling fluid for cooling the plurality of battery cells 50 are provided between the upper cell holder 10 and the lower cell holder 10 (cooling channels arranged in the middle portion of the plurality of battery cells 50) such leakage of the potting material may disturb the cooling channels. Additionally, leakage of the potting material is even dangerous, because the leaked potting material can be cured on an undesirable place (on the place where it leaked) and it will not seal the gap between the cell holder 10 and the corresponding battery cell 50. If sealing is not achieved, the cooling fluid can flow through its defined space to the undesirable place (it can leak from the middle portion of the battery cells between cell holder 10 and battery cells 50 to the upper and lower portion of the battery cells 50, or vice versa).

The present invention proposes to use feature that prevents potting leakage during the potting process.

In particular, the present invention proposes a cell holder comprising a feature configured to act as a support for the potting material while in fluid state. Details of this feature according to the embodiment of the present invention are shown in FIG. 2A, FIG. 2B and FIG. 2C.

Figures 2A, 2B, 2C:
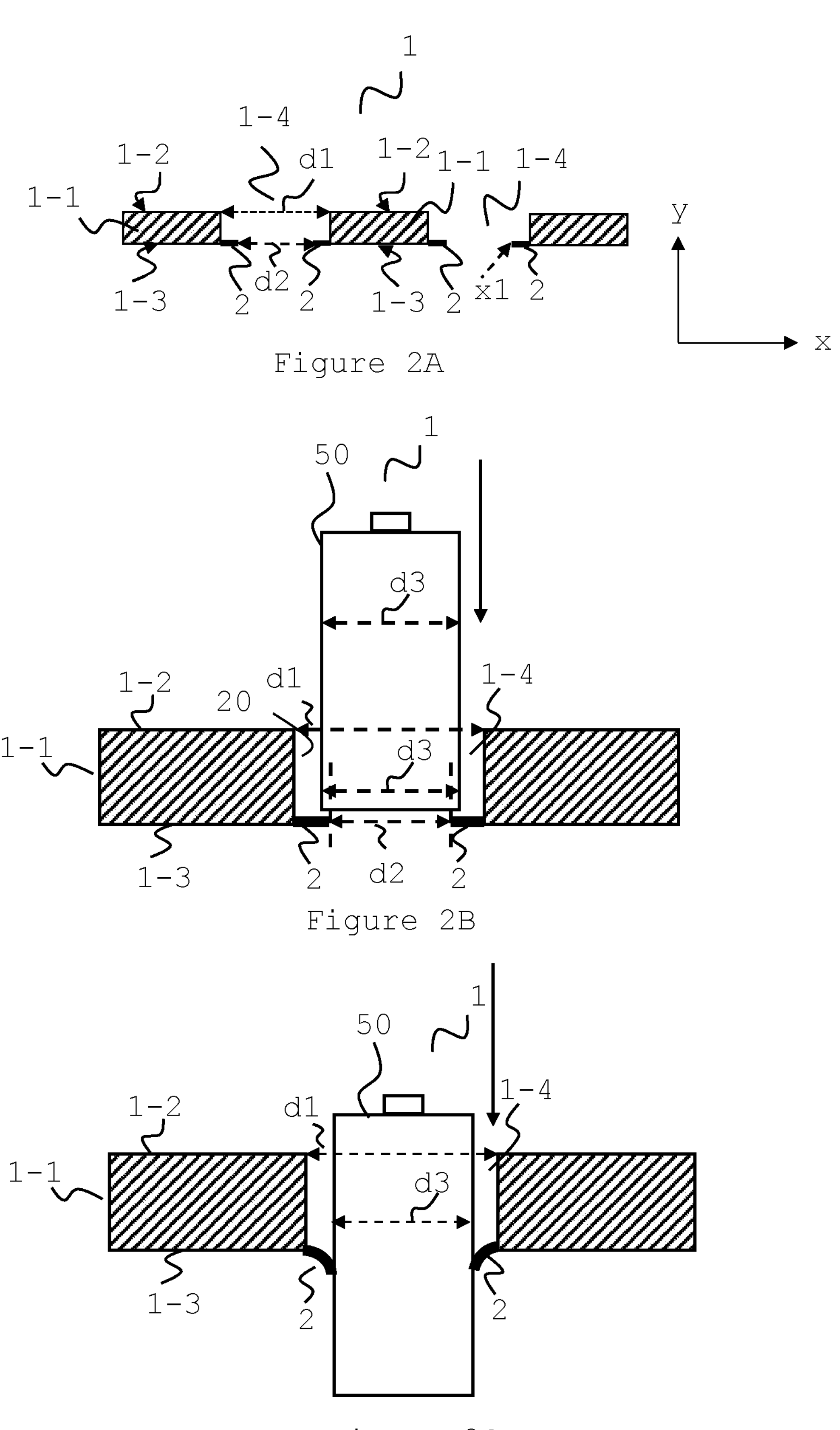
FIGS. 2A, 2B and 2C show a schematic view of a part of a cell holder and a battery cell according to an embodiment of the present invention.

There is shown in FIG. 2A a part of a cell holder 1 according to the embodiment of the present invention for holding a plurality of battery cells 50. The cell holder 1 comprises a body 1-1 (shown in FIG. 2A with the striped pattern fill), the body 1-1 having an upper surface 1-2, a lower surface 1-3 and a plurality of through openings 1-4 (two such through openings 1-4 being shown in FIG. 2A) each through opening 1-4 extending between the upper surface 1-2 and the lower surface 1-3 (in the figure extending along the y-direction, this direction also being called direction of extension of the through openings 1-4). As shown in FIG. 2A this direction of extension of each through opening 1-4 corresponds to the direction of extension of the battery cell 50 shown for example in FIG. 1B. Each through opening 1-4 is arranged to receive a battery cell 50. More specifically, each through opening 1-4 is arranged to receive a battery cell 50 inserted along the y-direction.

In each through opening 1-4 a deformable member 2 is protruding in the through opening 1-4 in a direction (x-direction in FIG. 2A) which is perpendicular to the direction of extension of the through opening (y direction, which is the direction along which the battery cell 50 is inserted) to thereby decrease the diameter of the through opening 1-4. The diameter of the through opening 1-4 is decreased such that the diameter of the through opening 1-4 in the plane in which the deformable member 2 is protruding (this diameter of the through opening being denoted as d2 in FIG. 2A) is smaller than the outer diameter of the battery cell 50 (the outer diameter of the battery cell 50 being denoted as d3 in FIG. 2B and FIG. 2C).

More specifically, the diameter (d2) of the through opening 1-4 in the plane in which the deformable member 2 is protruding is slightly smaller than the outer diameter (d3) of the battery cell 50. The term "slightly smaller" is to be understood as the diameter (d2) of the through opening 1-4 in the plane in which the deformable member 2 is protruding is smaller for a specific value than the outer diameter of the battery cell 50 (d3). The specific value may be in the range of 1 mm to 3 mm. The term "deformable" is to be understood as the "deformable" member being flexible by having at least the ability to bent.

The diameter of the through opening 1-4 of the cell holder 1 in the other parts of it in which no deformable member 2 is protruding, for example in the plane of the upper surface 1-2 in FIG. 2A, (this diameter being denoted with d1 in FIG. 2A) is slightly larger than the outer diameter of the battery cell 50 (d3) so that a small gap 20 is formed between the body 1-1 of the cell holder 1 and the battery cell 50 (FIG. 2B) in order that it is enabled that the battery cell 50 is inserted in the through opening 1-4 of the cell holder 1, as also elaborated above.

Accordingly, the deformable member 2 decreases the dimeter (d1) of the through opening 1-4 such that the diameter (d2) of the through opening 1-4 in the plane in which the deformable member is protruding (for example in the plane of the lower surface 1-3) is smaller than the outer diameter of the battery cell 50 (d3) so that the following relation between the described diameters applies: d1>d3>d2. This relation between the different diameters is shown in FIG. 2B (the dashed vertical lines that delimit the diameter d2 serving as a guidance for the eye) which shows the battery cell 50 during insertion into the through opening 1-4. The term "during insertion" is to be understand as the process of pushing the battery cell 50 inside the corresponding through opening 1-4.

There is shown in FIG. 2A that the deformable member 2 is protruding in the through opening 1-4 in the plane of the lower surface 1-3. However, in other embodiments of the present invention the deformable member 2 may protrude in the through opening 1-4 in the plane of the upper surface 1-2 or in the plane of both the upper surface 1-2 and the lower surface 1-3. The same elaborations regarding the deformable member 2 apply by analogy also in these other embodiments of the present invention.

As seen in details in FIG. 2A and FIG. 2B, in each through opening 1-4 of the cell holder 1 this deformable member 2 protrudes in the corresponding through opening 1-4 in the planar direction of the through opening (x-direction in FIG. 2A and FIG. 2B) to a predetermined position (this predetermined position being denoted as xl in FIG. 2A) in the through opening 1-4 such that the diameter (d2) of the through opening 1-4 in the plane in which the deformable member 2 is protruding is smaller (for a specific value as elaborated above) than the outer diameter of the battery cell (d3).

Therefore, during insertion of the battery cell 50 in the through opening 1-4 the deformable member 2 comes into contact with the outer wall of the battery cell 50 and bends (due to it being deformable or flexible) in the direction of insertion of the battery cell 50 under the applied pressure for insertion of the battery cell 50. Accordingly, the deformable member 2 is configured to deform when the battery cell 50 is inserted in the through opening 1-4. The term "contact" is to be understood as physical contact between the deformable member 2 and the outer wall of the battery cell 50.

This is shown schematically in FIGS. 2B and 2C which show schematically different stages of the insertion of the battery cell 50 in the corresponding through opening 1-4 from the direction of the upper surface 1-2 towards the lower surface 1-3 (this direction being shown with arrows in FIGS. 2B and 2C which is along the y-direction).

There is shown in FIG. 2B that the deformable member 2 lies in the plane of the lower surface 1-3 when it is not in contact with the outer wall of the battery cell 50 (specifically, in FIG. 2B the battery cell is pushed in the through opening 1-4 until a position which is above the deformable member 2). This state of the deformable member 2 when it lies in the plane of the lower surface 1-3 and is not in contact with the outer wall of the battery cell 50 will also be called here below a "free state". In the free state the deformable member 2 is horizontal or approximately horizontal. It is to be understood that the deformable member 2 in the free state may be approximately horizontal or in other words may be slightly deflected from the absolute horizontal position due to variations during the manufacturing process.

When the battery cell 50 is pushed further in the through opening 1-4 the deformable member 2 comes into contact with the outer wall of the battery cell 50 and it deforms by bending in the direction of insertion of the battery cell 50 in the corresponding through opening 1-4 by the pressure applied when pushing the battery cell 50 inside the through opening 1-4 as shown in FIG. 2C. This state of the deformable member 2 is also called a "bent state" or bent position to differentiate from the horizontal position or approximately horizontal position elaborated above in the free state of the deformable member 2.

The deformable member 2 remains in the bent position and in contact with the battery cell 50 (and more specifically with the outer wall of the battery cell 50) when the battery cell 50 is fully inserted in the through opening 1-4. Here, the term "fully inserted" is to be understood as a state in which the battery cell 50 has taken the final position in the cell holder 1. Accordingly, the deformable member 2 is in contact with the outer wall of the battery cell 50 "all the time". Here, the expression "all the time" indicates during insertion of the battery cell 50 as well as when the battery cell 50 is fully inserted in the through opening 1-4.

Since the deformable member 2 is in contact with the outer wall of the battery cell 50 it closes the gap 20 that exists due to, as elaborated above, d3<d1 and thereby acts as a support for the potting while in fluid state when a potting material is applied for fixing the battery cell to the body 1-1 of the cell holder 1 thereby preventing efficiently the above-described leakage of potting material.

The thickness and the length of the deformable member 2 may depend, for example, on the flexibility of the material of the deformable member 2, the pressure applied during insertion of the battery cells 50, and similar.

The thickness of the deformable member 2 is smaller than a threshold thickness so that the deformable member 2 bends (the deformable member 2 is flexible) during insertion of the battery cell 50 in the through opening 1-4 in the direction of insertion of the battery cell 50.

As elaborated above, the deformable member 2 decreases the diameter of the through opening 1-4 such that diameter of the through opening 1-4 in the plane in which the deformable member 2 is protruding is smaller than the outer diameter of the battery cell 50. However, it is preferred that the length of the deformable member 2 is at least a predetermined length that ensures that the deformable member 2 at least retains the contact with the outer wall of the battery cell 50 during insertion of the battery cell in the through opening 1-4 and when the battery cell 50 is fully inserted in the through opening 1-4.

By way of example, when the length of the deformable member 2 is at least a predetermined length, this ensures that the deformable member 2 does not flip-back during insertion of the battery cell 50 or when the battery cell 50 is fully inserted in the through opening 1-4.

In one embodiment of the present invention this deformable member 2 is a burr or a residue of the material used for injection moulding of the cell holder 1 and is formed by controlling the burr during injection moulding during fabrication of the cell holder 1 and may be formed at the lower surface or the upper surface of the body 1-1. Hence the deformable member 2 is a thin layer of the material of the cell holder 1 which protrudes in the through opening 1-4.

As mentioned above, the cell holder 1 may be fabricated by injection moulding. The material of the cell holder 1 is a polymer-based material. During injection moulding of the cell holder 1 the molten polymer-based material is injected into a mould cavity where it cools and hardens to take the shape of the mould cavity. The shape of the mould cavity corresponds to the shape of the cell holder 1 having the body 1-1, said body having the upper surface 1-2, the lower surface 1-2 and the plurality of through openings extending between the upper surface 1-2 and the lower surface 1-3 as elaborated above. The deformable member 2 is a burr or a residue of the injection moulding of the polymer-based material.

Burr is normally formed due to flowing of the molten polymer-based material away from the mould cavity. More specifically, the deformable member 2 is formed during injection moulding of the cell holder 1 by controlling the burr at an upper surface and/or a lower surface of the mould cavity to correspond to the upper surface 1-2 and the lower surface 1-3 of the body 1-1 of the cell holder 1 during injection moulding thereby extending the body 1-1 of the cell holder 1 to the predetermined position (xl) in the through opening 1-4. The controlling of the burr during injection moulding may comprise, for example, any one or a combination of, controlling the fluidity of the molten polymer-based material through controlling the melt temperature or the injection pressure of the molten polymer-based material, controlling presence or absence of foreign particles on the mould cavity that may serve as a seed for the burr, movement or deflection of the upper surface and the lower surface of the mould cavity with respect to a fixed surface which may be caused by external force or by the injection pressure and similar. Therefore, in this embodiment of the present invention the deformable member 2 is to be seen as being an extension of body 1-1 of the cell holder 1 in the planar direction of the through opening 1-4 to a predetermined position in the through opening 1-4.

In another embodiment of the present invention the deformable member 2 is formed by attaching a thin layer of a material on the upper surface 1-2 and/or the lower surface 1-3 of the body 1-1 of the cell holder 1. The attachment may be performed by applying adhesive layer. The thin layer also has through openings, however the diameter of the through openings of the thin layer is smaller than the diameter (d1) of the through openings 1-4 of the body 1-1 of the cell holder 1. The thin layer is aligned with respect to the body 1-1 of the cell holder such that the corresponding through openings are aligned. In this way, since the diameter of the through openings of the thin layer is smaller than the diameter of the through openings 1-4 when the thin layer is aligned with the body 1-1 and is attached to it, the deformable member 2 is formed. The material of the thin layer is a flexible material having the ability to bent.

As elaborated above, the cell holder 1 according to the present invention comprises a deformable member 2 protruding in each through opening 1-4 that is configured to come into contact with the outer wall of the battery cell 50 during insertion of the battery cell 50 in the corresponding through opening 1-4 and to bent in the direction of insertion of the battery cell 50 by the pressure applied when pushing the battery cell 50 inside the through opening 1-4 so that it deforms such as to bend in the direction of inserting the battery cell 50 in the corresponding through opening 1-4. Since the deformable member 2 is in this way in contact with the outer wall of the battery cell 50 it closes the gap 20 that should normally exist (since as elaborated above d3<d1) and thereby acts as a support for the potting material while in fluid state when a potting material is applied for fixing the battery cell to the body 1-1 of the cell holder 1 thereby preventing efficiently the above-described leakage of potting material. In addition, as elaborated above, the deformable member may be fabricated by controlling the burr during injection moulding of the cell holder or attaching thin layer to the upper surface and/or lower surface of the body of the cell holder 1 and hence enables that the deformable member 2 is fabricated in a simple way.

In this way the present invention provides for preventing potting leakage in a simple and efficient manner.

Figure 3:
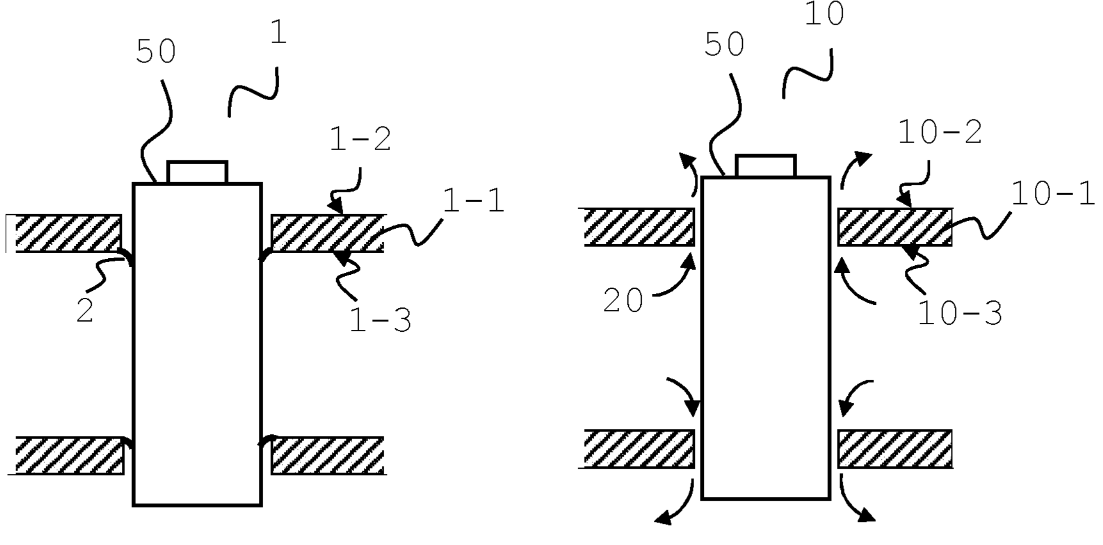
FIG. 3 shows a comparison of a cell holder according to the embodiment of the present invention with the cell holder shown in FIG. 1A.

This advantage of the cell holder 1 provided with the deformable member 2 according to the embodiment of the present invention in comparison with the cell holder 10 shown in FIGS. 1A and 1B is shown in FIG. 3 which shows in the left hand side the cell holder 1 according to the embodiment of the present invention and in the right hand side the cell holder 10 shown in FIG. 1A and hence not comprising such deformable member 2. As seen in FIG. 3, while in the cell holder 10 in the right hand side of the figure the potting material, when applied below the lower surface 10-2 of the body 10-1 of the cell holder 10 may leak through the gap 20 away from the cell holder 10 (said leakage indicated with arrows) in the cell holder 1 according to the embodiment of the present invention the gap between the battery cell 50 and the lower surface of the body 1-1 of the cell holder 1 is closed by the deformable member 2 which is in bent position and in contact with the outer wall of the battery cell 50 and hence prevents the leakage of the potting material.

Figure 4:
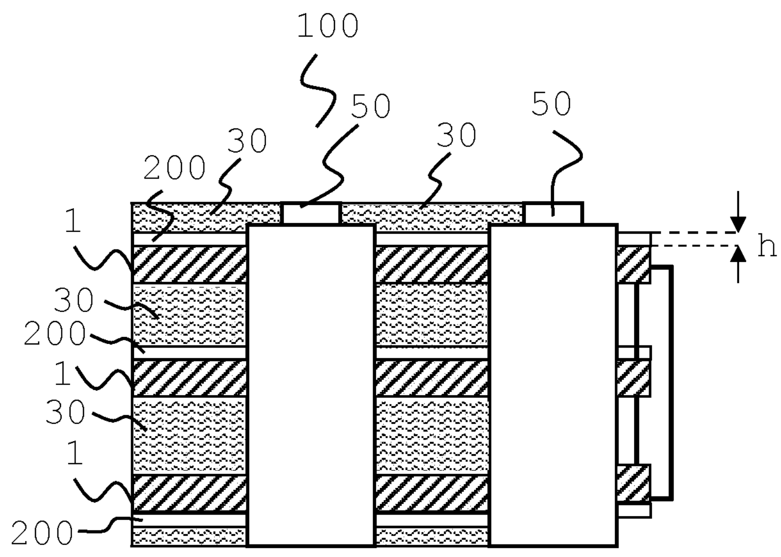
FIG. 4 shows a schematic view of a part of a battery module comprising the cell holder according to the embodiment of the present invention.

FIG. 4 shows a part of a battery module 100 according to the embodiment of the present invention. In this embodiment of the present invention the battery module 100 comprises three cell holders 1 each cell holder 1 being the one described above with reference to FIGS. 2A, 2B and 2C. The first (top) cell holder 1 is arranged at one end portion of the plurality of battery cells 50 when inserted in the plurality of through openings 1-4 of the first cell holder 1. The second (bottom) cell holder 1 is arranged at the opposite end portion of the plurality of battery cells 50 when inserted in the plurality of through openings 1-4 of the second cell holder 1. The battery module 100 comprises further at least one third (middle) cell holder 1 arranged between the first cell holder 1 and the second cell holder 1.

In other embodiment of the present invention the number of cell holders 1 may be different from the above-described three cell holders. For example, in other embodiment of the present invention the battery module 100 may comprise at least one cell holder 1 as the one described with reference to FIGS. 2A, 2B and 2C, or at least two cell holders each one being arranged on opposite end portion of the battery cells 50, or more than one cell holder arranged between the two cell holders 1 that are arranged on the opposite end portions of the battery cells 50. The number of cell holders 1 in the battery module 100 depends for example on the number of battery cells 50 housed in the battery module 100 and accordingly the dimensions of the battery module 100. Large number of cell holders 1 increases the stability of the battery module 100 however it also increases the weight of the battery module 100. Therefore, the number of cell holders may be chosen such as to achieve a balance between the stability of the battery module 100 and the weight of the battery module 100.

It is further shown in FIG. 4 that above or below each cell holder 1 a potting layer 200 is arranged. In FIG. 4 there is shown a top potting layer arranged above the top cell holder 1 (the cell holder 1 arranged at the top portion of the plurality of battery cells 50), bottom potting layer 200 arranged below the second cell holder 1 (cell holder 1 arranged at the bottom portion of the plurality of battery cells 50) and middle potting layer 200 arranged above the third cell holder 1 (cell holder arranged between the first cell holder 1 and the second cell holder 1). Each one of the potting layers 200 may also be arranged on the opposite side of the corresponding cell holder 1. The height (h) of each potting layer is in the range from 1 to 3 mm.

Cooling channels 30 are arranged on both sides of each cell holder 1. More specifically a first cooling channel 30 is arranged above the top potting layer 200, a second cooling channel 30 is arranged above the middle potting layer 200, a third cooling channel 30 is arranged above the second cell holder 1 and a fourth cooling channel 30 is arranged below the bottom potting layer 200.

It is to be understood that the number of cooling channels 30 and the number of potting layers 200 may differ in other embodiments of the present invention.

Figure 5:
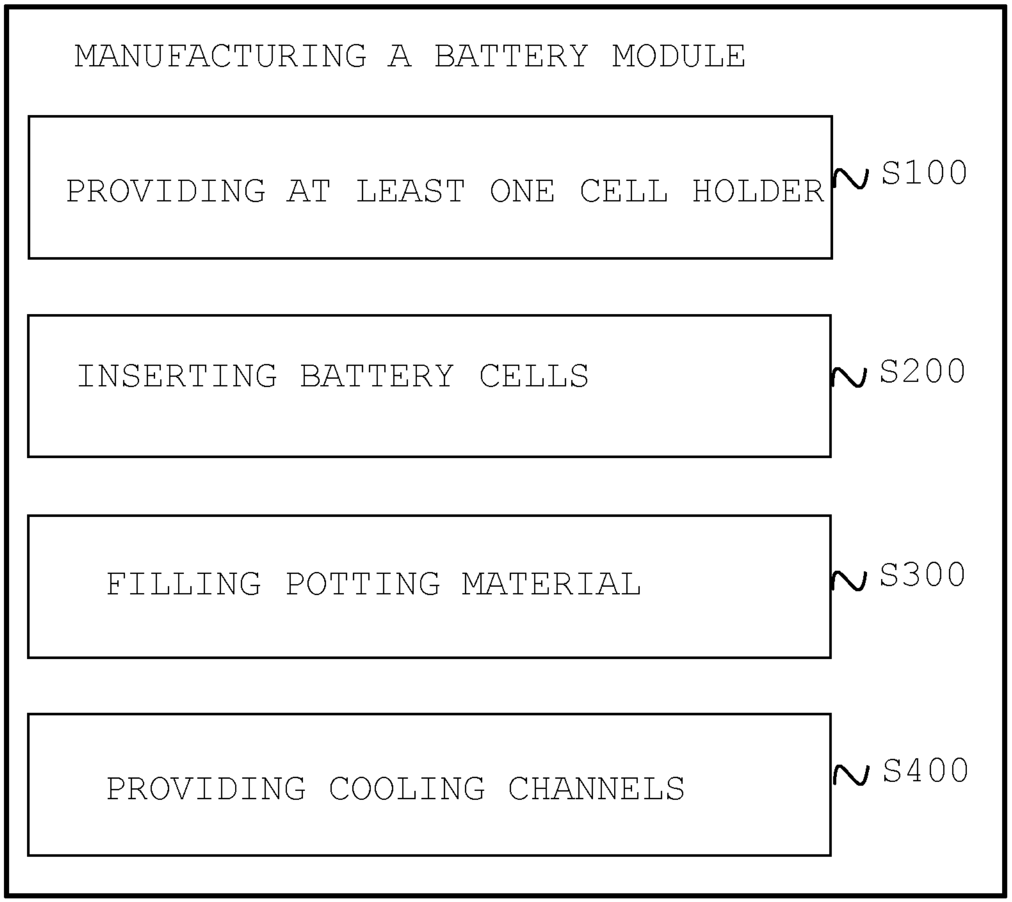
FIG. 5 shows a flow chart of a general method embodiment of manufacturing the battery module according to the embodiment of the present invention.

FIG. 5 shows a general method of manufacturing the battery module 100 according to the embodiment of the present invention.

The method comprises the steps of: providing (S100) at least one cell holder 1 as the cell holder 1 described above with reference to FIGS. 2A, 2B and 2C; inserting (S200) in each through hole 1-4 of the cell holder 1 a battery cell 50, filling (S300) potting material along the top and/or bottom surface of the body 1-1 of the cell holder 1; providing (S400) at least one cooling channel 30 above or below the 1-1 body of the at least one cell holder 1.

Although detailed embodiments have been described, these only serve to provide a better understanding of the invention defined by the independent claims and are not to be seen as limiting.

The invention claimed is:

1. A cell holder for holding a plurality of battery cells, the cell holder comprising a body comprising:

an upper surface;
a lower surface; and
a plurality of through openings, wherein:

each through opening extends between the upper surface and the lower surface and is arranged to receive a battery cell;

in each through opening a deformable member is protruding in the through opening in a direction which is perpendicular to the direction of extension of the through opening to thereby decrease the diameter of the through opening such that the diameter of the through opening in the plane in which the deformable member is protruding is smaller than the outer diameter of the battery cell; and the deformable member is configured to contact the outer wall of the battery cell during insertion of the battery cell in the through opening, and to bend in the direction of insertion of the battery cell to thereby close a gap existing between the body of the cell holder and the battery cell.

2. The cell holder according to claim 1, wherein the deformable member is configured to remain in a bent position and in contact with the outer wall of the battery cell when the battery cell is fully inserted in the through opening.

3. The cell holder of claim 1, wherein the thickness of the deformable member is smaller than a threshold thickness so that the deformable member bends during insertion of the battery cell in the through opening in the direction of insertion of the battery cell.

4. The cell holder of claim 1, wherein the length of the deformable member is a predetermined length so that the deformable member at least retains the contact with the outer wall of the battery cell during insertion of the battery cell in the through opening and when the battery cell is fully inserted in the through opening.

5. The cell holder of claim 1, wherein the deformable member protrudes in the through opening in the plane of the lower surface or upper surface or both the lower surface and the upper surface.

6. The cell holder of claim 1, wherein the deformable member is formed during injection moulding of the cell holder by controlling the burr at the lower surface and/or the upper surface during injection moulding thereby extending the body of the cell holder to a predetermined position in the through opening.

7. The cell holder of claim 1, wherein the deformable member is formed by a thin layer attached to at least one of the upper surface and lower surface of the body.

8. The cell holder of claim 1, wherein the cell holder is composed of a polymer-based material.

9. A battery module comprising a first cell holder according to claim 1 and a plurality of battery cells each one of the plurality of battery cells being inserted in one of the through openings.

10. The battery module according to claim 9, wherein the first cell holder is arranged at one end portion of the plurality of battery cells when inserted in the plurality of through openings.

11. The battery module according to claim 10, wherein the battery module further comprises a second cell holder comprising a second body, said second body having:

a second upper surface,
a second lower surface, and
a plurality of second through openings, wherein:

each second through opening extends between the second upper surface and the second lower surface and is arranged to receive a battery cell;

in each second through opening a second deformable member is protruding in the second through opening in a direction which is perpendicular to the direction of extension of the second through opening to thereby decrease the diameter of the second through opening such that the diameter of the second through opening in the plane in which the second deformable member is protruding is smaller than the outer diameter of the battery cell; and the second cell holder is arranged at the opposite end portion of the plurality of battery cells when inserted in the plurality of through openings.

12. The battery module according to claim 11, further comprising at least one third cell holder comprising a third body, said third body having:

a third upper surface,
a third lower surface, and
a plurality of third through openings, wherein:

each third through opening extends between the third upper surface and the third lower surface and is arranged to receive a battery cell;

in each third through opening a third deformable member is protruding in the third through opening in a direction which is perpendicular to the direction of extension of the third through opening to thereby decrease the diameter of the third through opening such that the diameter of the third through opening in the plane in which the third deformable member is protruding is smaller than the outer diameter of the battery cell; and said at least one third cell holder is arranged between said first cell holder and said second cell holder.

13. A method of manufacturing a battery module, said method comprising:

providing at least one cell holder according to claim 1;

inserting in each through hole of the cell holder a battery cell;

filling potting material along the top and/or bottom surface of the body of the cell holder; and providing at least one cooling channel above or below the body of the at least one cell holder.

* * * * *